United States Patent [19]
Lemke et al.

[11] Patent Number: 5,747,080
[45] Date of Patent: May 5, 1998

[54] METHOD FOR THE PREPARATION OF POPPED CEREAL PRODUCTS ENRICHED WITH VITAMINS, MINERAL NUTRIENTS AND/OR TRACE ELEMENTS

[76] Inventors: Stefan Lemke, Grüner Grund 4a, D-23669 Timmendorfer Strand; Angelos Sagredos, Lenhartzstrasse 6, D-20249 Hamburg, both of Germany

[21] Appl. No.: 766,594

[22] Filed: Dec. 12, 1996

[30] Foreign Application Priority Data

Dec. 14, 1995 [DE] Germany ............ 195 46 654.3

[51] Int. Cl.⁶ ............... A23L 1/302; A23L 1/304; A23L 1/18
[52] U.S. Cl. ............... 426/72; 426/73; 426/74; 426/99; 426/103; 426/241; 426/242; 426/243; 426/601; 426/629
[58] Field of Search ............... 426/72, 73, 74, 426/629, 241, 242, 243, 601, 99, 103

[56] References Cited

U.S. PATENT DOCUMENTS

| | | | |
|---|---|---|---|
| 3,656,965 | 4/1972 | Strommer et al. | 426/72 |
| 3,806,613 | 4/1974 | Carroll et al. | 426/72 |
| 4,767,635 | 8/1988 | Merritt et al. | 426/272 |
| 4,888,186 | 12/1989 | Cooley et al. | 426/99 |
| 5,215,770 | 6/1993 | Aramouni | 426/93 |
| 5,284,666 | 2/1994 | Graf | 426/242 |

FOREIGN PATENT DOCUMENTS

| | | |
|---|---|---|
| 0217368 | 10/1986 | European Pat. Off. |
| 0262791 | 10/1993 | European Pat. Off. |
| 2680082 | 4/1992 | France. |
| 3335781 | 9/1983 | Germany. |
| 4001069 | 1/1990 | Germany. |

*Primary Examiner*—Helen Pratt
*Attorney, Agent, or Firm*—Roylance,Abrams,Berdo & Goodman, L.L.P.

[57] ABSTRACT

The invention relates to a process for producing popped grain products enriched with vitamins, minerals and/or trace elements, especially popcorn. Before or during popping of the raw grain kernels a predetermined amount of vitamins and/or minerals and/or trace elements dissolved or dispersed by themselves alone or in a suitable carrier substance are placed in a suitable container in which the raw grain kernels are already located. The added micronutrients are heat treated together with the grain kernels for 1 to 5 minutes at a temperature from 130° to 280° C., or with microwaves at 400 to 1500 watts. At least most of the amount of micronutrients used are absorbed by the popping grain kernels and are uniformly distributed in them, so that a ready-to-eat popcorn product enriched with micronutrients is obtained.

19 Claims, No Drawings

METHOD FOR THE PREPARATION OF POPPED CEREAL PRODUCTS ENRICHED WITH VITAMINS, MINERAL NUTRIENTS AND/OR TRACE ELEMENTS

BACKGROUND OF THE INVENTION

This invention relates to a process for producing popped grain products enriched with vitamins, minerals and/or trace elements.

Processes for producing popped grain products, for example, popcorn, with different additives, with which the appearance and taste of the popped grain kernels are to be changed or improved, are known. The popped grain kernels, hereinafter called popcorn for short, are produced for example from suitable grain kernels, for example, raw corn kernels, by briefly heating them, for example, in a popping kettle, optionally in the presence of fats or fat plus sugar or fat plus salt, to temperatures above the boiling point of water, for example, to temperatures from 150° to 250° C. The water contained in the grain kernels suddenly vaporizes under the process conditions and in doing so the kernels burst with an increase in volume.

To improve or change the taste of popcorn, adding fats, sugar, salt, aromatic substances and/or sugar substitutes to the popcorn before, during or after popping of the grain kernels is known. In doing so, the effort is made to select process conditions such that the additives are distributed as uniformly as possible on the popped grain kernels.

Ready-to-eat popcorn can also be produced in a microwave device suitable for producing popcorn, the grain kernels being caused to pop optionally together with fat and sugar or fat and salt using microwave energy.

One type of production of fresh popcorn popular among small retailers takes place in relatively small popcorn devices which consist essentially of a heatable popping kettle with a stirring apparatus. After the popping kettle heats up for a time, a proportioned amount of fat in solid or liquid form is added to the vessel. This is followed by likewise proportioned amounts of corn kernels and sugar. While these products are being added, the stirring apparatus in the vessel is continually moving in order to mix the ingredients with one another and to prevent especially the sugar from burning onto the vessel wall. After roughly 1 to 1.5 minutes at a temperature between 130° and 2800° C. the corn kernels begin to pop and they absorb at least part of the fat/sugar mixture surrounding them in a rather uniform distribution. The finished popcorn is then removed from the popcorn machine when the stirring apparatus is shut off and can be emptied in batches.

DE-OS 33 35 781 discloses a process for producing caramelized or sugar-glazed popcorn which is produced by preparing a molten mixture of fat and sugar in a vessel heated to roughly 250° C. and then adding the raw corn kernels to this molten mixture until they pop. It is important that the fat or oil is always added to the vessel before the sugar, since otherwise the sugar cooks on to the pan wall. Fat and sugar are used in a weight ratio of roughly 1:14. Other additives, such as peanuts, almonds, food coloring or aroma compounds such as chocolate, can also be added to the molten mixture.

EP-B-0262791 discloses a process for producing coated popcorn, in which the corn kernels are fried together with oil in a vessel using microwave energy, after which a candy bar consisting of shortening, water, edible emulsifier and a sweetener is placed on the fried corn and is melted onto it using microwave energy and in doing so a coating is formed on the popcorn.

A process for producing tasty, oil- and fat-free popcorn is described in U.S. Pat. No. 4,767,635 in which, before popping, the raw corn is coated with an edible adhesive, for example, gelatin, an edible salt, and dye and flavoring materials, preferably in an aqueous solution. After drying, a reduced-calorie popcorn is produced by treatment with hot air.

In another process known disclosed in U.S. Pat. No. 4,888,186, the already prepared, still hot popcorn is sprayed with a mixture of fat with a melting point of not less than 35° C. and flavoring substances, for example, an onion-seasoning mixture and/or salt in a ratio of, for example, 1:1.

DE-OS 40 01 069 discloses a process for producing modified, sugar-free popcorn in which the popcorn is produced by popping raw corn under the action of heat and in the presence of the sweetener isomalt. Popping is done at a temperature of about 130° to 150° C. with simultaneous continuous stirring. The coating mass is composed of the sweetener, vegetable fats and fruit flavoring materials.

A reduced-calorie popcorn mixed with aroma agents and artificial sweeteners is described in U.S. Pat. No. 5,215,770. It consists of an amount of conventionally popped corn kernels with a seasoned cover layer applied to the popcorn, in turn consisting of at least about 30% by weight polydextrose, seasonings, and artificial sweeteners, and roughly 5 to 208 by weight water. The seasoned cover layer should be essentially fat-free.

The finished popcorn contains only very small amounts of various vitamins, minerals and trace elements which are only insignificantly increased by using fruit concentrates, for example, essences of grapes, oranges, cherries and strawberries. These traces of micronutrients are too small to play a noticeable role in terms of nutrition physiology when consumed in conventional amounts, for example, 100 g of conventional popcorn.

Since popcorn is a very popular snack mainly for children and teenagers, in terms of nutrition physiology it would be desirable if popcorn products significantly enriched with vitamins, minerals and trace elements were available.

Known processes for production of popcorn provide for a series of the most varied additives for improving appearance and taste, but give no indications for enrichment of the popcorn with micronutrients which are important in nutrition physiology, especially vitamins, minerals, and trace elements, in an amount effective for humans. One of the reasons for this is the known high sensitivity of at least some of these micronutritional components, especially the vitamins, to a high thermal or energy load, which makes it seem futile to expose these components to the conditions of popcorn production at temperatures between 130° and 280° C. or correspondingly high-energy microwave treatment, since it would be expected that these micronutritional components would decompose almost completely and thus lose their desired effect.

Furthermore, it could not be expected that under the conditions of very brief popping the minerals and trace elements under consideration would pass to the required degree onto the popped grain kernels and would be uniformly distributed, since at least for most of these components it would be expected that due to their high boiling point or lack of one or very low vapor pressure, problems would arise in passage onto the popped grain kernels.

SUMMARY OF THE INVENTION

The object of this invention is to devise a process for producing popped grain products enriched with vitamins, minerals and/or trace elements, in which these essential micronutrients, in spite of the high thermal and energy loads applied during popping of the raw grain kernels, are absorbed intact by the popped kernels to such a degree that the ready-to-eat popcorn product contains a much higher amount of these micronutrients which is enough to cover the daily requirement for these substances which are essential to man, in whole or at least to a not inconsiderable degree, with a conventional amount consumed, for example 100 g of popcorn. Furthermore, the process should be as manageable as possible, so that proportioned addition of the individual micronutritional components can take place during popcorn production in as few steps as possible and the process can also be conducted even with untrained personnel.

To achieve this object, according to the invention, a process for producing popped grain products enriched with vitamins, minerals and/or trace elements is proposed, in which raw grain kernels are popped by the brief action of heat or microwave energy, optionally while stirring, in a suitable container. The process is characterized in that before or during popping of the raw grain kernels, a predetermined amount of vitamins and/or minerals and/or trace elements dissolved or dispersed by themselves or in a suitable carrier substance, is placed in the container, together with the grain kernels. The mixture is then subjected for 1 to 5 minutes to treatment either at a temperature from 130° to 280° C., preferably from 170° to 240° C., or with microwaves at 400 to 1500 watts, preferably 600 to 800 watts. At least most of the amount of vitamins and/or minerals and/or trace elements used, and if present, the carrier substance, are absorbed by the popping grain kernels and distributed uniformly in them, and a ready-to-eat popcorn product enriched with micronutrients is thus obtained.

DETAILED DESCRIPTION OF THE INVENTION

The caloric nutritional value of a popcorn product produced in the conventional manner using fat and sugar depends on the number of grain kernels, amount of fat and sugar used, and for example when using corn kernels at a composition of the popping corn of roughly 160 grams of corn, 40 grams of fat and 60 g of sugar, is roughly 500 kcal per 100 g of popcorn. The quality of the popcorn is however not solely determined by the caloric nutritional value, but, as already mentioned, also by its content of micronutrients, i.e., the content of vitamins, minerals and trace elements. These micronutrients are present in conventional popcorn in only very small amounts, as shown in Table I, below. The results were obtained from a ready-to-eat popcorn which was produced from 6 parts by weight corn, 2 parts by weight fat and 3 parts by weight sugar. The popcorn product studied contains the amounts of micronutritional components listed in Table I. For comparison purposes, the recommended daily dose of the corresponding components are given.

It follows from Table I that the amounts of micronutrients contained in 100 g of popping corn comprise only a fraction of the recommended daily requirement, so that the consumption of for example 100 g of popcorn contributes only minimally to covering the daily requirement for micronutrients.

TABLE I

| Micronutrient | Amount determined per 100 g of popcorn | Recommended daily dose |
|---|---|---|
| Vitamins: | | |
| C | 10 mg | 75 mg |
| E | 1.5 mg | 12 mg |
| A | <0.01 mg | 0.8 mg |
| B1 | 0.06 mg | 1.6 mg |
| B2 | 0.08 mg | 2.0 mg |
| B6 | 0.06 mg | 2.0 mg |
| B12 | 0.05 mg | 5.0 mg |
| Niacin | 0.2 mg | 18 mg |
| Pantothenic acid | 0.05 mg | 6 mg |
| Folic acid | 0.001 mg | 0.4 mg |
| Biotin | 0.4 µg | 150 µg |
| Minerals and trace elements: | | |
| Sodium | 0.8 mg | 1.5–4 g |
| Potassium | 200 mg | 1–3 g |
| Calcium | 3.2 mg | 800 mg |
| Magnesium | 48 mg | 300 mg |
| Phosphorus | 240 mg | 800 mg |
| Iron | 2.0 mg | 18 mg |
| Zinc | 1.7 mg | 15 mg |
| Copper | 0.02 mg | 3 mg |
| Manganese | 0.8 mg | 4 mg |
| Chromium | 0.01 mg | 0.1 mg |
| Selenium | <3.0 µg | 50 µg |

Surprisingly, it was ascertained that popcorn can be enriched with vitamins, minerals, and trace elements in a sufficient amount if provisions are made for these micronutrients to be added either directly, preferably using a metering means, in a predetermined amount to the container, preferably shortly before popping or at the latest during popping, so that the micronutrients can be absorbed immediately after adding the grain kernels to be popped at least to a large extent, or dissolved or dispersed beforehand in a suitable carrier substance and afterwards added together with the carrier substance to the raw grain kernels before or during popping. Although popping of the grain kernels takes place in an open or covered popping kettle at a temperature from 130° to 280° C. or with microwaves from 400 to 1500 watts, when the conditions of the process according to the invention are observed an astonishingly higher percentage of the micronutrients used passes intact onto the popcorn. They are essentially uniformly distributed on the popcorn, optionally together with the carrier substance. The unwanted decomposition at high temperatures and with the high-energy microwave radiation used, surprisingly occurs to a much lesser degree than expected. This also applies unexpectedly largely to micronutrients which are especially thermally sensitive, such as vitamin C.

These surprising results are clearly demonstrated in the following examples by comparison of the added amounts of micronutrient components to the grain kernels before or during popping with the effective amounts of these components deposited on the finished popcorn.

As the base material for the production of popcorn products enriched with vitamins, minerals and/or trace elements, essentially all types of grains can be used with kernels which have a sufficiently high water content, so that they burst when heated above the boiling point of water with an increase in volume, i.e., can be popped. Preferably corn, wheat and/or rice kernels are used as the grain kernels to be popped in the process according to the invention.

In one embodiment of the process according to the invention, in which the micronutrients are added to the container by themselves alone, direct addition of the predetermined amount of vitamins and/or minerals and/or trace elements to the container takes place preferably by using a metering means.

In another embodiment, the micronutrients are dissolved or dispersed in a carrier substance before they are placed in the container. Preferably, one or more suitable animal and/or vegetable fats and/or oils and/or sugar and/or table salt are used as a carrier substance. Butter fat is used preferably as the animal fat, and coconut oil, palm kernel oil, rapeseed oil, cocoa butter, cottonseed oil, sunflower oil, soybean oil and/or hydrogenated plant fats are used as the vegetable fat or vegetable oil. A mixture of 80 to 97% by weight soybean oil and/or rapeseed oil and/or coconut butter and/or sunflower oil and 20 to 3% by weight butter fat and/or cocoa butter and/or hydrogenated vegetable fats is preferably used as the carrier substance.

In another preferred embodiment, a mixture of one or more fats and/or oils and an amount of 1 to 6% by weight table salt, relative to the total weight of the finished popcorn product, is used as the carrier substance.

Since in many regions, instead of salt-containing popcorn products, those with a sweet taste are preferred, in the process according to the invention sugar can also be used as the carrier substance, preferably saccharose, especially in the form of granulated sugar, as well as fructose and dextrose. The process according to the invention can also be executed with mixtures of fat and/or oil with sugar, in which the weight ratio of the fat and/or oil to sugar must be selected such that the resulting mixture has the desired consistency and ensures good processing capacity in the stirring device. In one preferred embodiment, a mixture of one or more fats and/or oils and sugar in a weight ratio of 0.3:1 to 5:1 is used, the weight ratio of fat and/or oil to sugar in the range from 0.5:1 to 1:1 being especially preferred. In one especially preferred embodiment, 2 parts by weight fat and/or oil and 3 parts by weight sugar are used because it has been established that this mixture can be processed especially easily.

According to the invention, preferably niacin, pantothenic acid, folic acid, biotin, vitamins A, B1, B2, B6, B12, vitamin C and/or vitamin E are used as the vitamins, and these vitamins are added preferably directly or to the carrier substance in an amount such that the finished popcorn contains 10 to 300%, preferably 20 to 100%, of the recommended daily dose of these vitamins per 100 g of popcorn.

Basically all those mineral and trace elements which are needed for human nutrition and metabolism can be used in the process according to the invention. Preferably, sodium, potassium, calcium, magnesium, iron, zinc, copper, manganese and/or chromium in the form of carbonates, hydrogen carbonates, phosphates, hydrogen phosphates, chlorides, sulfates, gluconates and/or fatty acid salts and/or selenium as selenite or amino acid selenium compounds (so-called selenium yeasts) are used as the minerals and trace elements.

To achieve the object of the process according to the invention, the minerals and/or trace elements are added preferably directly or to the carrier substance in an amount such that the finished popcorn contains 10 to 100% of the recommended daily dose of these substances.

In one preferred embodiment of the process according to the invention, the amount of vitamins, minerals and/or trace elements to be added is dissolved or dispersed in the carrier substance at a temperature from 20° to 90° C. with continuous stirring and the resulting homogenized product, which can be stored, after cooling at 4° C. to room temperature, for a longer time, for example, 3 months, is added to the grain kernels in a predetermined amount.

In another preferred embodiment, first the fat and/or oil is heated to 70° to 90° C., then the sugar and/or table salt is slowly added while stirring, and the resulting mixture is homogenized as stirring continues, whereupon, at a temperature from 20° to 90° C., predetermined amounts of vitamins, minerals and/or trace elements are added and the entire mixture is stirred until it is homogenous. The resulting product can be stored for a longer time at temperatures from 4° C. to room temperature, for example, 3 months, and used when necessary according to the invention.

The invention is further explained using examples.

EXAMPLE 1

In a vessel which can be heated and which is equipped with a stirring apparatus, the following amounts of micronutrients are slowly added to 1 kg of a fat mixture of 90% by weight sunflower oil and 10% by weight cocoa butter as the carrier substance while stirring at 30° C.:

| Micronutrients | Added amount, mg/kg fat |
| --- | --- |
| Vitamin B1 | 46 |
| Vitamin B2 | 65 |
| Vitamin B6 | 58 |
| Vitamin B12 | 0.65 |
| Niacin | 578 |
| Pantothenic acid | 195 |
| Folic acid | 4.6 |
| Biotin | 4.6 |
| Vitamin A | 32.5 |
| Vitamin E | 923 |
| Vitamin C | 2782 |
| Sodium | 5570 |
| Potassium | 7423 |
| Calcium | 6961 |
| Magnesium | 3250 |
| Iron | 461 |
| Zinc | 370 |
| Copper | 91 |
| Manganese | 46 |
| Chromium | 4.6 |

The micronutritional components were dissolved or dispersed in the carrier substance. The mixture then continued to be stirred for a short time until it was homogenized. It contains the micronutrients in a uniform distribution, can be packaged, can be stored for at least 3 months when cooled at 4° C. up to room temperature, and can be delivered to the individual popcorn producers as requested.

Eighty (80) grams of the fat mixture containing the micronutrients prepared as described above were mixed with 120 g of sugar and 320 g of raw corn kernels at 250° C. for 5 minutes while being stirred in a heated popping kettle with a stirring apparatus and a frying volume of 1 liter, and the corn kernels were popped. In doing so, the carrier substance of fat and sugar and the micronutrients contained therein were absorbed by the popped corn kernels uniformly distributed.

The popcorn produced in this way was analyzed using the methods described by A. N. Sagredos, A. Huettmann and R. Roettgermann in "Fette, Seifen, Anstrichmittel" 88, 581 (1986) and A. N. Sagredos and W. Hartfiel, "Fat. Sci. Technol." 92, 522 (1990). The amounts of micronutrients in the finished popcorn products determined in doing so were compared to the amounts of micronutrients added to the popcorn batch before popping. The results are summarized in Table II.

Table II shows that the popcorn product produced according to the invention is highly enriched with the indicated micronutrients and that, of the added vitamins, minerals and trace elements, a surprisingly high percentage has passed to the finished popcorn product.

For the amounts determined in Table II for potassium, magnesium, zinc and manganese, in the finished popcorn product it was found that these amounts are higher than the amounts added beforehand to the popcorn batch. This apparent discrepancy is due to the fact that the popcorn inherently has a content of these minerals and trace elements which is added to the added amount.

TABLE II

| Micronutrients | Added amount, mg/ 100 g popcorn batch | Determined amount, mg/100 g popcorn |
|---|---|---|
| Vitamin B1 | 0.71 | 0.45 |
| Vitamin B2 | 1.0 | 0.43 |
| Vitamin B6 | 0.89 | 0.81 |
| Vitamin B12 | 0.01 | 0.008 |
| Niacin | 8.9 | 8.7 |
| Pantothenic acid | 3.0 | 2.01 |
| Folic acid | 0.071 | 0.043 |
| Biotin | 0.071 | 0.045 |
| Vitamin A | 0.50 | 0.35 |
| Vitamin E | 14.2 | 8.7 |
| Vitamin C | 42.8 | 15.0 |
| Sodium | 85.7 | 62.5 |
| Potassium | 114.2 | 271.9 |
| Calcium | 107.1 | 80.4 |
| Magnesium | 50.0 | 88.0 |
| Iron | 7.1 | 4.3 |
| Zinc | 5.7 | 6.4 |
| Copper | 1.4 | 1.26 |
| Manganese | 0.71 | 0.82 |
| Chromium | 0.07 | 0.05 |

EXAMPLE 2

Instead of fat, sugar was used as the carrier substance for the micronutrients.

In a vessel with a stirring apparatus, the following amounts of micronutrients were slowly added to 1 kg of granulated sugar at room temperature while continuously stirring and the mixture was homogenized:

| Micronutrients | Added amount, mg/kg fat |
|---|---|
| Vitamin B1 | 30 |
| Vitamin B2 | 43 |
| Vitamin B6 | 38 |
| Vitamin B12 | 0.43 |
| Niacin | 385 |
| Pantothenic acid | 130 |
| Folic acid | 3 |
| Biotin | 3 |
| Vitamin A | 22 |
| Vitamin E | 615 |
| Vitamin C | 1854 |
| Sodium | 3714 |
| Potassium | 4948 |
| Calcium | 4641 |
| Magnesium | 2166 |
| Iron | 307 |
| Zinc | 247 |
| Copper | 60 |
| Manganese | 30 |
| Chromium | 3 |

A storable sugar product in which the micronutrients are uniformly distributed is obtained.

To produce a popcorn product with enriched micronutrients, in a popping kettle with a stirring apparatus heated to 230° C., 80 g of a fat mixture of 5% by weight butter-fat and 95% by weight soybean oil were mixed with 120 g of the aforementioned sugar product containing the micronutrients and with 320 g of raw corn kernels for 5 minutes. In doing so, the micronutrients together with the fat mixture used and the sugar were absorbed uniformly by the popped corn kernels.

Analysis of the popcorn enriched with vitamins, minerals and trace elements was done using the same methods as in Example 1 and yielded the results summarized in Table III.

TABLE III

| Micronutrients | Added amount, mg/ 100 g popcorn batch | Determined amount, mg/100 g popcorn |
|---|---|---|
| Vitamin B1 | 0.69 | 0.41 |
| Vitamin B2 | 0.99 | 0.52 |
| Vitamin B6 | 0.87 | 0.83 |
| Vitamin B12 | 0.01 | 0.007 |
| Niacin | 8.9 | 8.4 |
| Pantothenic acid | 3.0 | 1.65 |
| Folic acid | 0.069 | 0.032 |
| Biotin | 0.069 | 0.039 |
| Vitamin A | 0.50 | 0.31 |
| Vitamin E | 14.2 | 8.3 |
| Vitamin C | 42.8 | 16.3 |
| Sodium | 85.7 | 75.1 |
| Potassium | 114.2 | 233.6 |
| Calcium | 107.1 | 79.0 |
| Magnesium | 50.0 | 90.5 |
| Iron | 7.1 | 5.4 |
| Zinc | 5.7 | 6.6 |
| Copper | 1.38 | 1.2 |
| Manganese | 0.69 | 0.76 |
| Chromium | 0.069 | 0.04 |

For the reasons given in Example 1, the amounts for potassium, magnesium, zinc and manganese determined in the finished popcorn product are also higher here than the corresponding amounts added to the popcorn batch.

EXAMPLE 3

In a heated agitator vessel, 400 g of a mixture of 90% by weight coconut oil and 10% by weight cocoa butter and butter fat in equal proportions were heated to 90° C. and then 600 g of granulated sugar were slowly added while stirring. The mixture continued to be stirred at the same temperature until a homogenous mass was formed. Then, the following amounts of micronutrients were added to the mixture while continuously stirring at room temperature:

| Micronutrients | Added amount, mg/kg fat-sugar mixture |
|---|---|
| Vitamin B1 | 20 |
| Vitamin B2 | 28 |
| Vitamin B6 | 25 |
| Vitamin B12 | 0.3 |
| Niacin | 250 |
| Pantothenic acid | 85 |
| Folic acid | 2.0 |
| Biotin | 2.0 |
| Vitamin A | 14 |
| Vitamin E | 400 |
| Vitamin C | 1200 |
| Sodium | 2400 |
| Potassium | 3200 |
| Calcium | 3000 |

| Micronutrients | Added amount, mg/kg fat-sugar mixture |
| --- | --- |
| Magnesium | 1400 |
| Iron | 200 |
| Zinc | 160 |
| Copper | 40 |
| Manganese | 20 |
| Chromium | 2 |

The micronutrients were dissolved or dispersed in the fat-sugar mixture by intensive stirring. A homogenous fat-sugar mixture containing the micronutrients in a uniform distribution was obtained which can be stored for up to 3 months at 4° C. up to room temperature and can be delivered to the popcorn producers when needed.

In a popping kettle with a stirring apparatus, 200 g of the fat-sugar mixture with the micronutrients were mixed with 320 g of raw corn kernels at 180° C. while continuously stirring and the corn kernels were popped. The fat-sugar mixture with the micronutrients was uniformly absorbed by the popped corn kernels.

Analysis of the popcorn enriched with vitamins, minerals and trace elements was done using the methods given in Example 1 and yielded the results summarized in Table IV.

TABLE IV

| Micronutrients | Added amount, mg/100 g popcorn batch | Determined amount, mg/100 g popcorn |
| --- | --- | --- |
| Vitamin B1 | 0.77 | 0.49 |
| Vitamin B2 | 1.07 | 0.45 |
| Vitamin B6 | 0.96 | 0.56 |
| Vitamin B12 | 0.011 | 0.008 |
| Niacin | 9.6 | 8.5 |
| Pantothenic acid | 3.2 | 1.5 |
| Folic acid | 0.077 | 0.031 |
| Biotin | 0.077 | 0.042 |
| Vitamin A | 0.54 | 0.29 |
| Vitamin E | 15.3 | 7.8 |
| Vitamin C | 46.2 | 17.1 |
| Sodium | 92.3 | 67.6 |
| Potassium | 123.0 | 243.5 |
| Calcium | 115.3 | 79.7 |
| Magnesium | 53.8 | 85.0 |
| Iron | 7.6 | 5.9 |
| Zinc | 6.1 | 7.1 |
| Copper | 1.5 | 1.5 |
| Manganese | 0.77 | 0.85 |
| Chromium | 0.077 | 0.05 |

The higher amounts determined for potassium, magnesium, zinc and manganese compared to the corresponding amounts added to the popcorn batch can in turn be attributed to the basic content of these minerals already present in the popcorn.

EXAMPLE 4

The following amounts of vitamins were added to 1 kg of a fat mixture of 85% by weight rapeseed oil and 15% by weight cocoa butter and butter fat in equal proportions as the carrier substance under the same conditions as in Example 1:

| Micronutrients | Added amount, mg/kg fat |
| --- | --- |
| Vitamin B1 | 50 |
| Vitamin B2 | 70 |
| Vitamin B6 | 62 |
| Vitamin B12 | 0.075 |
| Niacin | 625 |
| Pantothenic acid | 212 |
| Folic acid | 5.0 |
| Biotin | 5.0 |
| Vitamin A | 35 |
| Vitamin E | 1000 |
| Vitamin C | 3000 |

The vitamins were dissolved or dispersed in the carrier substance and the mixture was then stirred for a short time until it was homogenized.

In a popping kettle as is described in Example 1 which had been preheated to 230° C., 160 g of the fat mixture containing the vitamins prepared as described above were mixed for 4 minutes with 360 g of raw corn kernels and 40 g of table salt while being continuously stirred, and in doing so the corn kernels were popped. The fat mixture with the vitamins and the table salt was absorbed by the popped corn kernels uniformly distributed The resulting popcorn product was analyzed according to the methods given in Example 1. The results obtained are summarized in Table V.

TABLE V

| Micronutrients | Added amount, mg/100 g popcorn batch | Determined amount, mg/100 g popcorn |
| --- | --- | --- |
| Vitamin B1 | 1.4 | 0.91 |
| Vitamin B2 | 2.0 | 1.1 |
| Vitamin B6 | 1.77 | 1.69 |
| Vitamin B12 | 0.002 | 0.002 |
| Niacin | 17.8 | 15.7 |
| Pantothenic acid | 6.0 | 3.2 |
| Folic acid | 0.14 | 0.07 |
| Biotin | 0.14 | 0.08 |
| Vitamin A | 1.0 | 0.4 |
| Vitamin E | 28.5 | 19.2 |
| Vitamin C | 85.7 | 33.9 |

Table V shows that with the process according to the invention, popcorn products can be significantly enriched with the vitamins used.

EXAMPLE 5

As described in Example 3, a fat-sugar mixture was provided with micronutrients, 500 g of a mixture of 97% by weight soybean oil and 3% by weight butter fat having been mixed with 500 g of granulated sugar and the following amounts of micronutrients having been added to the mixture:

| Micronutrients | Added amount, mg/kg fat-sugar mixture |
| --- | --- |
| Vitamin B1 | 48 |
| Vitamin B2 | 48 |
| Vitamin B6 | 48 |
| Vitamin B12 | 0.15 |
| Niacin | 540 |
| Pantothenic acid | 200 |

-continued

| Micronutrients | Added amount, mg/kg fat-sugar mixture |
|---|---|
| Folic acid | 18 |
| Biotin | 1.8 |
| Vitamin A | 36 |
| Vitamin E | 480 |
| Vitamin C | 3000 |
| Sodium | 7500 |
| Potassium | 7500 |
| Calcium | 7500 |
| Magnesium | 4500 |
| Iron | 300 |
| Zinc | 300 |
| Copper | 90 |
| Manganese | 90 |
| Chromium | 6 |
| Selenium | 3 |

The fat-sugar mixture thus obtained with a content of micronutrients was used to produce popped wheat which was enriched with micronutrients and which was produced by the action of microwave energy.

The fat-sugar mixture (20 g) containing the micronutrients prepared as described above was thoroughly mixed at room temperature with 40 g of raw wheat kernels while stirring. The resulting mixture, in which the raw wheat kernels were distributed as uniformly as possible, was placed in a bag suitable for treatment with microwaves. The bag was then sealed, placed in a microwave oven and heated for roughly 3 minutes at 600 to 800 watts, the wheat kernels being popped in the bag and the fat-sugar mixture with the micronutrients having been uniformly absorbed by the popped wheat kernels.

The microwave popped wheat produced in this way was analyzed using the methods indicated in Example 1. Results are summarized in following Table VI.

TABLE VI

| Micronutrients | Added amount, mg 100 g popcorn batch | Determined amount, mg/100 g popcorn |
|---|---|---|
| Vitamin B1 | 1.6 | 1.2 |
| Vitamin B2 | 1.6 | 0.7 |
| Vitamin B6 | 1.6 | 1.0 |
| Vitamin B12 | 0.005 | 0.003 |
| Niacin | 18 | 16.6 |
| Pantothenic acid | 6.6 | 4.7 |
| Folic acid | 0.6 | 0.4 |
| Biotin | 0.06 | 0.05 |
| Vitamin A | 1.2 | 0.63 |
| Vitamin E | 16 | 8.5 |
| Vitamin C | 100 | 41 |
| Sodium | 250 | 220 |
| Potassium | 250 | 415 |
| Calcium | 250 | 237 |
| Magnesium | 150 | 187 |
| Iron | 10 | 6.8 |
| Zinc | 10 | 7.2 |
| Copper | 3 | 2.3 |
| Manganese | 3 | 2.8 |
| Chromium | 0.2 | 0.08 |
| Selenium | 0.1 | 0.04 |

The results of Table VI show that with the process according to the invention, popped wheat products enriched with essential micronutrients can also be produced using the process according to the invention. The added micronutrients after treatment in microwaves in which the wheat kernels are popped are preserved to a high percentage in the popped product.

EXAMPLE 6

In a heated agitator vessel, 400 g of palm kernel oil were heated to 90° C. and then 600 g of granulated sugar were slowly added while stirring. The mixture continued to be stirred at the same temperature until a homogenous mass was formed. Then, the following amounts of micronutrients were slowly added to the mixture with continuous stirring at room temperature:

| Micronutrients | Added amount, mg/kg fat-sugar mixture |
|---|---|
| Vitamin B1 | 20 |
| Vitamin B2 | 28 |
| Vitamin B6 | 25 |
| Vitamin B12 | 0.3 |
| Niacin | 250 |
| Pantothenic acid | 85 |
| Folic acid | 2.0 |
| Biotin | 2.0 |
| Vitamin A | 14 |
| Vitamin E | 400 |
| Vitamin C | 1200 |
| Sodium | 2400 |
| Potassium | 3200 |
| Calcium | 3000 |
| Magnesium | 1400 |
| Iron | 200 |
| Zinc | 160 |
| Copper | 40 |
| Manganese | 20 |
| Chromium | 2 |

The micronutrients were dissolved or dispersed in the fat-sugar mixture by intensive stirring. A homogeneous fat-sugar mixture containing the micronutrients in a uniform distribution was obtained which can be stored for at least 3 months at 4° C. up to room temperature and can be delivered to popcorn producers as needed.

In a popping kettle with a stirring apparatus, 200 g of the fat-sugar mixture with the micronutrients prepared as described above were mixed with 320 g raw wheat kernels at 220° C. while being continuously stirred and in doing so the wheat kernels were popped. The fat-sugar mixture with the micronutrients was uniformly absorbed by the popped wheat kernels.

Analysis of the popped wheat enriched with vitamins, minerals and trace elements was done using the methods given in Example 1 and yielded the results summarized in Table VII.

TABLE VII

| Micronutrients | Added amount, mg/ 100 g popcorn batch | Determined amount, mg/100 g popcorn |
|---|---|---|
| Vitamin B1 | 0.77 | 0.54 |
| Vitamin B2 | 1.07 | 0.41 |
| Vitamin B6 | 0.96 | 0.62 |
| Vitamin B12 | 0.011 | 0.007 |
| Niacin | 9.6 | 9.4 |
| Pantothenic acid | 3.2 | 1.8 |
| Folic acid | 0.077 | 0.038 |
| Biotin | 0.077 | 0.061 |
| Vitamin A | 0.54 | 0.25 |
| Vitamin E | 15.3 | 8.9 |
| Vitamin C | 46.2 | 21.2 |
| Sodium | 92.3 | 72.3 |
| Potassium | 123.0 | 190.1 |
| Calcium | 115.3 | 86.7 |
| Magnesium | 53.8 | 79.9 |
| Iron | 7.6 | 5.0 |

TABLE VII-continued

| Micronutrients | Added amount, mg/ 100 g popcorn batch | Determined amount, mg/100 g popcorn |
|---|---|---|
| Zinc | 6.1 | 6.3 |
| Copper | 1.5 | 1.1 |
| Manganese | 0.77 | 0.62 |
| Chromium | 0.077 | 0.03 |

The higher amounts determined for potassium and magnesium compared to the corresponding amounts added to the popcorn batch can in turn be attributed to the basic content of these minerals already present in the popcorn.

EXAMPLE 7

As described in Example 3; a fat-sugar mixture was provided with micronutrients, 500 g of semihydrogenated vegetable oil having been mixed with 500 g granulated sugar and the following amounts of micronutrients were added to the mixture:

| Micronutrients | Added amount, mg/kg fat-sugar mixture |
|---|---|
| Vitamin B1 | 48 |
| Vitamin B2 | 48 |
| Vitamin B6 | 48 |
| Vitamin B12 | 0.15 |
| Niacin | 540 |
| Pantothenic acid | 200 |
| Folic acid | 18 |
| Biotin | 1.8 |
| Vitamin A | 36 |
| Vitamin E | 480 |
| Vitamin C | 3000 |
| Sodium | 7500 |
| Potassium | 7500 |
| Calcium | 7500 |
| Magnesium | 4500 |
| Iron | 300 |
| Zinc | 300 |
| Copper | 90 |
| Manganese | 90 |
| Chromium | 6 |
| Selenium | 3 |

The fat-sugar mixture obtained in this way with a content of micronutrients was used to produce popped corn which was enriched with micronutrients and which was produced by the action of microwaves.

Thus, the fat-sugar mixture (20 g) containing the micronutrients prepared as described above was thoroughly mixed at room temperature with 40 g of raw corn kernels while stirring. The resulting mixture, in which the raw corn kernels were distributed as uniformly as possible, was placed in a bag suitable for treatment with microwaves. The bag was then sealed, placed in microwave oven, and heated for roughly 3 minutes at 600 to 800 watts, the corn kernels being popped in the bag and the fat-sugar mixture with the micronutrients having been uniformly absorbed by the popped corn kernels.

The microwave popped corn produced in this way was analyzed using the methods indicated in Example 1. Results are summarized in following Table VIII.

TABLE VIII

| Micronutrients | Added amount, mg/ 100 g popcorn batch | Determined amount, mg/100 g popcorn |
|---|---|---|
| Vitamin B1 | 1.6 | 1.1 |
| Vitamin B2 | 1.6 | 0.85 |
| Vitamin B6 | 1.6 | 0.92 |
| Vitamin B12 | 0.005 | 0.0027 |
| Niacin | 18 | 17.5 |
| Pantothenic acid | 6.6 | 4.0 |
| Folic acid | 0.6 | 0.44 |
| Biotin | 0.06 | 0.056 |
| Vitamin A | 1.2 | 0.57 |
| vitamin E | 16 | 10.3 |
| Vitamin C | 100 | 35 |
| Sodium | 250 | 235 |
| Potassium | 250 | 387 |
| Calcium | 250 | 222 |
| Magnesium | 150 | 198 |
| Iron | 10 | 5.3 |
| Zinc | 10 | 8.1 |
| Copper | 3 | 2.8 |
| Manganese | 3 | 2.4 |
| Chromium | 0.2 | 0.11 |
| Selenium | 0.1 | 0.03 |

As the results of Table VIII show, with the process according to the invention, popped corn products enriched with essential micronutrients can be produced using the process according to the invention. The added micronutrients after treatment with microwaves in which the corn kernels are popped are preserved to a high percentage in the popped product.

EXAMPLE 8

A powdered mixture of micronutrients of the following composition was produced:

| Micronutrients | Amount (in g) |
|---|---|
| Vitamin B1 | 3.0 |
| Vitamin B2 | 4.3 |
| Vitamin B6 | 3.8 |
| Vitamin B12 | 0.043 |
| Niacin | 38.5 |
| Pantothenic acid | 13.0 |
| Folic acid | 0.3 |
| Biotin | 0.3 |
| Vitamin A | 2.2 |
| Vitamin E | 61.5 |
| Vitamin C | 185.4 |
| Sodium | 371.4 |
| Potassium | 494.8 |
| Calcium | 464.1 |
| Magnesium | 216.6 |
| Iron | 30.7 |
| Zinc | 24.7 |
| Copper | 6.0 |
| Manganese | 3.0 |
| Chromium | 0.3 |

In a popping kettle heated to 230° C. with a stirring apparatus first 80 g of a fat mixture of 5% by weight butter fat and 95% by weight soybean oil were mixed with 120 g granulated sugar and 320 g of raw corn kernels for 5 minutes. Briefly before popping or at latest during popping a predetermined amount of the aforementioned micronutrient mixture was placed in the popping kettle by means of a metering device while stirring. In doing so the micronutrients together with the fat/sugar mixture used were uniformly absorbed by the popped corn kernels.

Analysis of the popcorn enriched with vitamins, minerals and trace elements done using the methods given in Example 1, yielded the results summarized in Table IX.

TABLE IX

| Micronutrients | Added amount, mg/ 100 g popcorn batch | Determined amount, mg/100 g popcorn |
| --- | --- | --- |
| Vitamin B1 | 1.40 | 0.81 |
| Vitamin B2 | 1.98 | 0.78 |
| Vitamin B6 | 1.74 | 1.56 |
| Vitamin B12 | 0.02 | 0.015 |
| Niacin | 17.8 | 16.8 |
| Pantothenic acid | 6.0 | 3.69 |
| Folic acid | 0.138 | 0.075 |
| Biotin | 0.138 | 0.080 |
| Vitamin A | 1.0 | 0.72 |
| Vitamin E | 28.4 | 18.5 |
| Vitamin C | 85.6 | 34.2 |
| Sodium | 171.4 | 150.8 |
| Potassium | 228.4 | 478.0 |
| Calcium | 214.2 | 169.3 |
| Magnesium | 10.0 | 130.5 |
| Iron | 14.2 | 10.8 |
| Zinc | 11.4 | 12.4 |
| Copper | 2.76 | 2.62 |
| Manganese | 1.38 | 1.46 |
| Chromium | 0.138 | 0.07 |

For the reasons indicated in Example 1, the amounts for potassium, magnesium, zinc and manganese determined in the finished popcorn product are also higher here than the corresponding amounts added to the popcorn batch.

We claim:

1. A process for producing popped grain products enriched with vitamins, minerals and/or trace elements, comprising popping raw grain kernels in a container by the action of heat or microwaves with or without stirring, wherein before or during popping of the raw grain kernels a predetermined amount of vitamins and/or minerals and/or trace elements, dissolved or dispersed in one or more suitable animal and/or vegetable fats and/or oils and/or sugar and/or table salt as a carrier substance is placed in the container together with the grain kernels and is subjected for 1 to 5 minutes to treatment either at a temperature from 130° to 280° C. or with microwaves at 400 to 1500 watts, whereby at least most of the amount of vitamins and/or minerals and/or trace elements used, and the carrier substance, are absorbed by the popping grain kernels and are distributed uniformly in said popped grain kernels, to provide a ready-to-eat popcorn product enriched with micronutrients.

2. A process according to claim 1, wherein corn, wheat and/or rice kernels are used as the grain kernels to be popped.

3. A process according to claim 1, wherein a predetermined amount of vitamins and/or minerals and/or trace elements is placed directly in the container using a metering means.

4. A process according to claim 1, wherein butter fat is used as the animal fat.

5. A process according to claim 1, wherein coconut oil, palm kernel oil, rapeseed oil, cocoa butter, cottonseed oil, sunflower oil, soybean oil and/or hydrogenated plant fats are used as the vegetable fat or vegetable oil.

6. A process according to claim 1, wherein a mixture of 80 to 97% by weight soybean oil and/or rapeseed oil and/or coconut butter and/or sunflower oil and 20 to 3% by weight butter fat and/or cocoa butter and/or hydrogenated vegetable fats is used as the carrier substance.

7. A process according to claim 1, wherein a mixture of one or more fats and/or oils and an amount of 1 to 6% by weight table salt, relative to the total weight of the finished popcorn product, is used as the carrier substance.

8. A process according to claim 1, wherein saccharose, fructose and/or dextrose are used as the sugar.

9. A process according to claim 1, wherein a mixture of one or more fats and/or oils and sugar in a weight ratio of 0.3:1 to 5:1 is used.

10. A process according to claim 9, wherein the weight ratio of fat and/or oil to sugar is in the range from 0.5:1 to 1:1.

11. A process according to claim 9, wherein 2 parts by weight fat and/or oil and 3 parts by weight sugar are used.

12. A process according to claim 1, wherein niacin, pantothenic acid, folic acid, biotin, vitamins A, B1, B2, B6, B12, vitamins C and/or E are used as the vitamins.

13. A process according to claim 12, wherein the vitamins are each added directly or together with the carrier substance to the grain kernels to be popped in an amount such that the finished popcorn contains 10 to 300% of the recommended daily dose of these vitamins per 100 g of popcorn.

14. A process according to claim 12, wherein the vitamins are each added directly or together with the carrier substance to the grain kernels to be popped in an amount such that the finished popcorn contains 20 to 100% of the recommended daily dose per 100 g of popcorn.

15. A process according to claim 1, wherein sodium, potassium, calcium, magnesium, iron, zinc, copper, manganese and/or chromium in the form of carbonates, hydrogen carbonates, phosphates, hydrogen phosphates, chlorides, sulfates, gluconates and/or fatty acid salts and/or selenium as selenite or amino acid selenium compounds are used as the minerals and trace elements.

16. A process according to claim 15, wherein the minerals and/or trace elements are each added directly or together with the carrier substance to the grain kernels to be popped in an amount such that the finished popcorn contains 10 to 100% of the recommended daily dose of these substances.

17. A process according to claim 1, wherein the amount of vitamins, minerals and/or trace elements to be added is dissolved or dispersed in the carrier substance at a temperature from 20° to 90° C. with continuous stirring and the resulting homogenized product is added to the grain kernels in a predetermined amount.

18. A process according to claim 1, wherein first a fat and/or oil is heated to 70° to 90° C., then a sugar and/or table salt is slowly added while stirring, and the resulting mixture is homogenized as stirring continues, whereupon at a temperature from 20° to 90° C. predetermined amounts of vitamins, minerals and/or trace elements are added and the entire mixture is stirred until it is homogenous.

19. A process according to claim 1, wherein said container is an open or covered popping kettle or a microwave oven.

* * * * *